(12) United States Patent
Fujisawa et al.

(10) Patent No.: US 6,754,434 B2
(45) Date of Patent: Jun. 22, 2004

(54) AV DATA RECORDING/REPRODUCING APPARATUS, AV DATA RECORDING/ REPRODUCING METHOD, AND RECORDING MEDIUM

(75) Inventors: Ichiro Fujisawa, Kanagawa (JP); Yoshizo Mihara, Kanagawa (JP); Masaki Hirose, Kanagawa (JP); Kazuo Kamiyama, Kanagawa (JP)

(73) Assignee: Sony Corporation, Tokyo (JP)

( * ) Notice: Subject to any disclaimer, the term of this patent is extended or adjusted under 35 U.S.C. 154(b) by 87 days.

(21) Appl. No.: 09/962,986

(22) Filed: Sep. 24, 2001

(65) Prior Publication Data

US 2002/0076197 A1 Jun. 20, 2002

Related U.S. Application Data

(63) Continuation of application No. PCT/JP01/00493, filed on Jan. 25, 2001.

(30) Foreign Application Priority Data

Jan. 25, 2000 (JP) ........................................ 2000-016011

(51) Int. Cl.[7] .............................................. H04N 5/93
(52) U.S. Cl. ........................................ 386/52; 386/55
(58) Field of Search ............................. 386/52, 55, 64; 348/716, 714; H04N 5/93

(56) References Cited

U.S. PATENT DOCUMENTS

| 4,272,790 A | * | 6/1981 | Bates ........................... 386/52 |
| 5,465,120 A | * | 11/1995 | Schulteiss ..................... 386/64 |
| 5,801,685 A | * | 9/1998 | Miller et al. .............. 715/500.1 |
| 5,841,740 A | | 11/1998 | Fijita et al. |

FOREIGN PATENT DOCUMENTS

| BR | 9605908 A | 12/1996 |
| CN | 1164799 A | 11/1997 |
| EP | 0 778 572 A2 | 6/1997 |
| JP | 9-163310 | 6/1997 |
| JP | 9-163311 | 6/1997 |
| JP | 10-149668 | 6/1998 |

* cited by examiner

Primary Examiner—Vincent Boccio
(74) Attorney, Agent, or Firm—Frommer Lawrence & Haug LLP; William S. Frommer (57) ABSTRACT

An AV data recording/reproducing apparatus which has a recording section for recording AV data, e.g., a disk array section. Each frame unit is edited to generate editing result information. The AV data is read from the disk array section on the basis of the editing result information to reproduce the edited AV data. A command analysis section receives various linear editing commands generated by a linear editing machine for generating editing information and from which a command is produced to generate the editing result information. Thus, an editing operation using a familiar linear editing machine can be performed.

6 Claims, 7 Drawing Sheets

AV DATA RECORDING/REPRODUCING APPARATUS, AV DATA RECORDING/REPRODUCING METHOD, AND RECORDING MEDIUM

This is a Continuation of International Application PCT/JP01/00493 Filed Jan. 25, 2001.

TECHNICAL FIELD

The present invention relates to an AV data recording/reproducing apparatus, an AV data recording/reproducing method, and a recording medium and, more particularly, to an AV data recording/reproducing apparatus, an AV data recording/reproducing method, and a recording medium using a nonlinear disk device.

BACKGROUND ART

In recent years, material recording for AV (Audio Visual) data in a broadcast station, a post production, or the like has been performed by an AV data recording/reproducing apparatus using a nonlinear device. The nonlinear device uses a large-capacity hard disk as a recording medium, and has an excellent advantage over a magnetic tape devices because the nonlinear device can perform very-high-speed search and exact editing (so-called "nonlinear editing") in units of frames.

As a conventional AV data recording/reproducing apparatus using a nonlinear disk device of this type, for example, AV data recording/reproducing apparatus described in, e.g., Japanese Patent Application No. 10-319037 (corresponding to U.S. application Ser. No. 09/435964 and E.P. application number 99308900.2) is known.

SUMMARY OF THE INVENTION

Figure 1A:
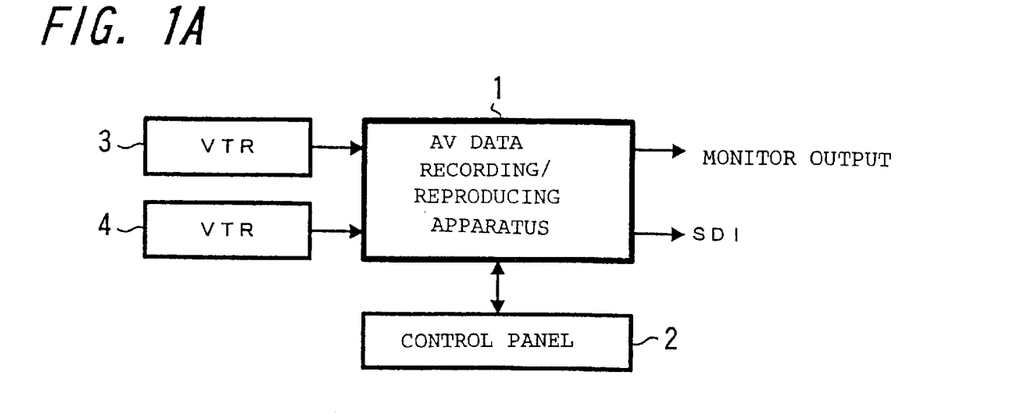
FIG. 1 is a diagram of a used state of a conventional AV data recording/reproducing apparatus.
Figure 1B:
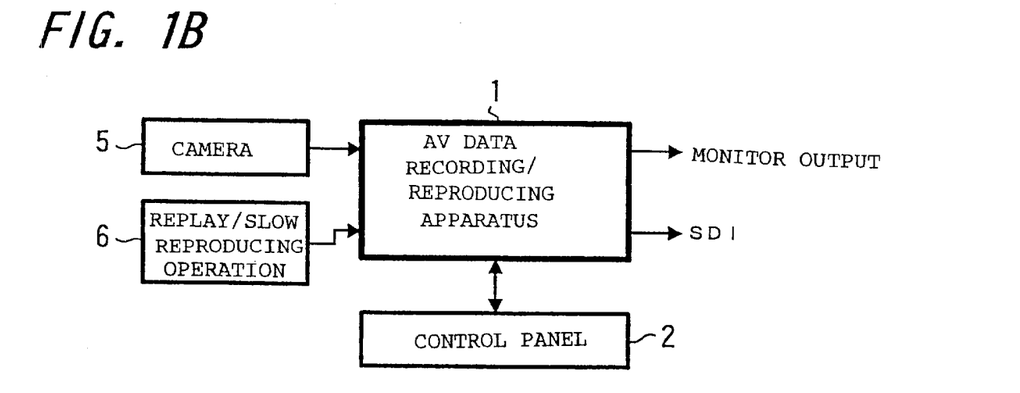
Figure 1C:
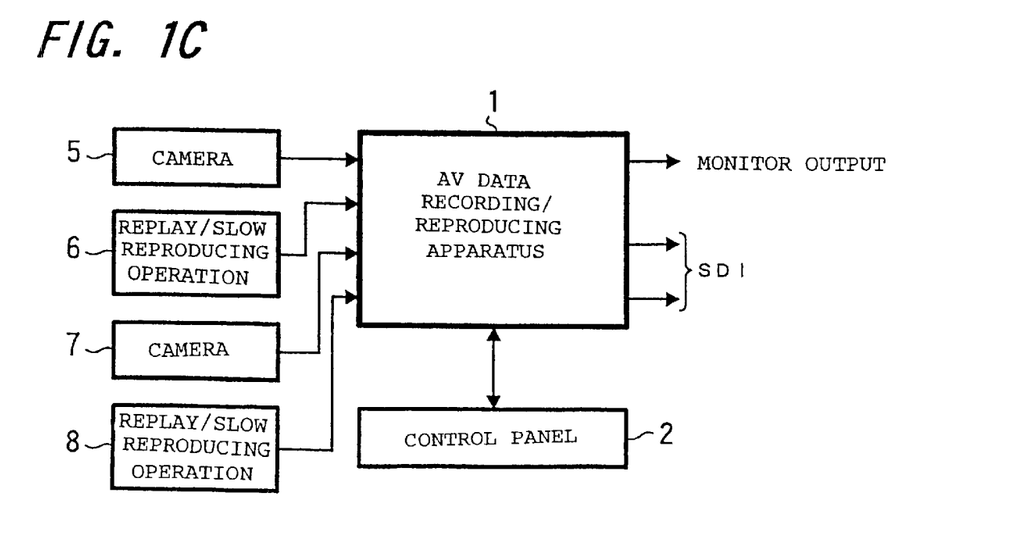

In FIG. 1, the AV data recording/reproducing apparatus 1 comprises a plurality of ports (not shown) (hereinafter referred to as a "P1 port", a "P2 port", a "R1 port", and a "R2 port" for the sake of expediency) as access ports for a built-in hard disk. When these ports are controlled by a control panel 2, for example, the R1 port and the R2 port in FIG. 1(a) are respectively assigned to a VTR (Video Tape recorder) 3 and a VTR 4, AV data from the two VTRs 3 and 4 are simultaneously recorded and one of the recorded data is output from the P1 port or the P2 port. While AV data from one camera 5 in FIG. 1(b) is recorded from the R1 port or the R2 port, the recorded data is operated and output by a replay/slow reproducing operation unit 6. While AV data from two cameras 5 and 7 in FIG. 1(c) are recorded from the R1 port and the R2 port, the recorded data can be operated and output by replay/slow reproducing operation units 6 and 8 for each of the ports.

The character "P" of each of the P1 port and the P2 port is the initial character (i.e., output-only ports) of a PLAYER, and the character "R" of each of the R1 port and the R2 port is the initial character (i.e., input-only port) of a RECORDER.

To the input ports (P1 port and P2 port) of the respective ports, AV data of a predetermined transmission format, i.e., the SDI (Serial Digital Interface) standardized as the SMPTE-259M or the SDTI (Serial Digital Transfer Interface) format standardized as the SMPTE-305M are input from the VTR 3, 4. AV data is extracted from the data of the SDI or SDTI format, subjected to a process such as a compression process such as the MPEG if necessary. On the output port, when the AV data reproduced from the hard disk is subjected to a compression process, the AV data is subjected to a decompression process. A process of converting the format into data of the SDI or SDTI and outputting the data is performed.

In addition, each of the ports is intended such that it time-divisionally access the hard disk in a time slot for performing arbitration of a bus to the hard disk. The following processes are performed. That is, in a certain time slot period, only the P1 port is allowed to access the hard disk, AV data is transferred from the hard disk. In the next time slot period, only the P2 port is allowed to access the hard disk, AV data is transferred from the hard disk. In the next time slot period, the R1 port transfers the processed AV data to the hard disk.

As a recording medium in the AV data recording/reproducing apparatus 1, a RAID (Redundant Array of Inexpensive Disks) is used. The recording medium is designed to sufficiently secure a redundancy with respect to the AV data and a sufficient transfer rate of the data.

The aforedescribed AV data recording/reproducing apparatus has an excellent advantage over a magnetic tape device because the AV data recording/reproducing apparatus can perform meticulous editing (nonlinear editing) in each unit of frame. The editing operation is performed such that a user operates a required pointing device such as a mouse while interacting with a GUI (Graphical User Interface) displayed on the display of the control panel 2. For this reason, the user cannot use the AV data recording/reproducing apparatus without understanding at least the mechanism of the GUI or a command interface. For this reason, a required training is necessary. However, the AV data recording/reproducing apparatus cannot be immediately put into practice even after the AV data recording/reproducing apparatus is installed at a site such as a broadcast station or a post production.

The present invention provides an AV data recording/reproducing apparatus which, after the AV data recording/reproducing apparatus is introduced, makes unnecessary education and training on the use of a nonlinear editing machine to thereby improve immediate usefulness by paying an attention to the fact that many persons are skilled in operation of a linear editing machine at sites such as a broadcast station, a post production and the like.

The present invention, in an AV data recording/reproducing apparatus having a recording unit (e.g., disk array unit) for recording AV data, which edits the AV data recorded on the recording section in each unit of frame to generate the editing result information, and which reads out the AV data from the recording section on the basis of the editing result information to reproduce the edited AV data, is characterized by comprising a command analysis section which receives a command required for generating the editing result information from among various linear editing commands generated by a linear editing machine and which generates the editing result information on the basis of the command.

The present invention, in an AV data recording/reproducing method which records AV data on a recording section, which edits the AV data recorded on the recording section in each unit of frame to generate the editing result information, and which reads the AV data from the recording section on the basis of the editing result information to reproduce the edited AV data, is characterized by comprising the step of receiving a command required for generating the editing result information from among various linear editing commands generated by a linear editing machine, and the step of generating the editing result information on the basis of the command.

According to the present invention, a recording medium which stores a program applied to an AV data recording/reproducing apparatus having a recording section for recording AV data, which edits the AV data recorded on the recording section in each unit of frame to generate the editing result information, and which reads the AV data from the recording section on the basis of the editing result information to reproduce the edited AV data, is characterized in that the program is a program which realizes a command analysis section which receives a command required for generating the editing result information from among various linear editing commands generated by a linear editing machine and which generates the editing result information on the basis of the command.

The present invention, in an AV data recording/reproducing apparatus having a disk array section having AV data recorded thereon, which edits the AV data recorded on the disk array section in each unit of frame to generate the editing result information, and which reads the AV data from the disk array section on the basis of the editing result information to reproduce the edited AV data, is characterized by comprising a command analysis section which receives a command required for generating the editing result information from among various linear editing commands generated by a linear editing machine and which generates the editing result information on the basis of the command.

The present invention, in an AV data recording/reproducing method which records AV data on a disk array section, which edits the AV data recorded on the disk array section in each unit of frame to generate the editing result information, and which reads the AV data from the disk array section on the basis of the editing result information to reproduce the edited AV data, is characterized by comprising the step of receiving a command required for generating the editing result information from among various linear editing commands generated by a linear editing machine, and the step of generating the editing result information on the basis of the command.

According to the present invention, a recording medium which stores a program applied to an AV data recording/reproducing apparatus which has a disk array section for recording AV data, which edits the AV data recorded on the disk array section in each unit of frame to generate the editing result information, and which reads the AV data from the disk array section on the basis of the editing result information to reproduce the edited AV data, is characterized in that the program is a program which realizes a command analysis section which receives a command required for generating the editing result information from among various linear editing commands generated by a linear editing machine and which generates the editing result information on the basis of the command.

The present invention makes it possible to perform an editing operation using a considerably familiar linear editing machine.

DETAILED DESCRIPTION

An embodiment of the present invention will be described below with reference to the drawings. Note that the illustrations of various detailed instructions or examples, numeral values, character strings, other symbols are references for making the spirit and scope of the present invention clear.

The spirit and scope of the present invention are not limited to all or part of these illustrations. Detailed description of known methods, known procedures, known architectures, known circuit configurations, and the like (to be referred to as "known items" hereinafter) are omitted. However, this omission is to make explanations simple, and all or part of these known items are not intentionally precluded. Since the known items can be known by skilled persons when the present invention is filed, the known items are included in the following explanation.

Figure 2A:
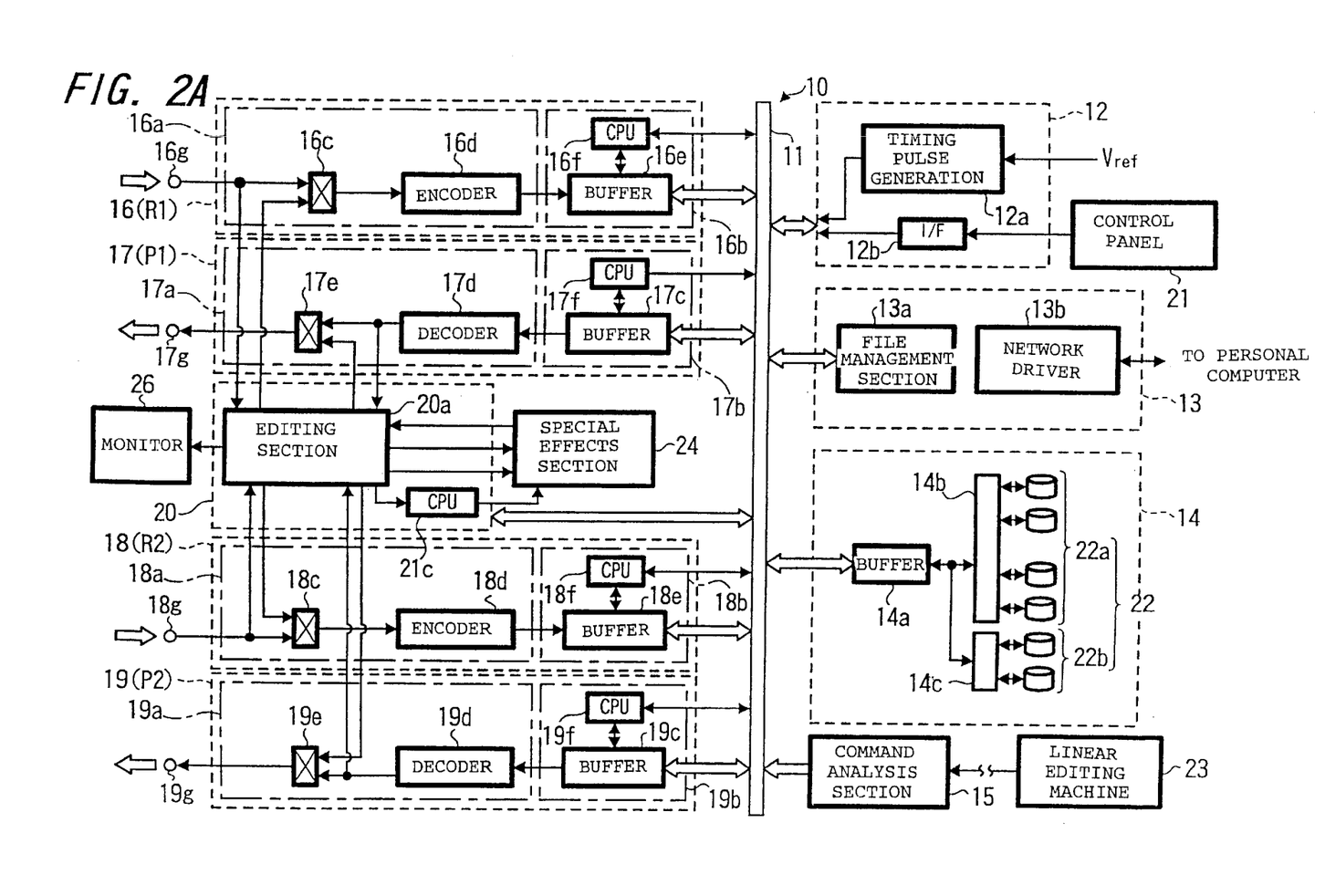
FIG. 2A is a block diagram showing an entire configuration of an AV data recording/reproducing apparatus according to the present invention.

FIG. 2A is a block diagram showing the entire configuration of an AV data recording/reproducing apparatus according to the present invention. An AV data recording/reproducing apparatus 10 comprises a bus 11 for transferring AV data or a command. The AV data recording/reproducing apparatus 10 is constituted such that respective sections such as a timing management section 12, an information management section 13, a recording/reproducing section 14, a command analysis section 15, a plurality of ports 16 to 19, and a controller 20 are connected to the bus 11.

The timing management section 12 is constituted by a timing pulse generator 12a and an interface (I/F) 12b.

The timing pulse generator 12a receives a reference signal Vref as a local synchronous signal and generates a timing pulse synchronized with the reference signal. This pulse is input to the ports 16 to 19, the controller 20, and the like through the bus 11 to synchronously operate the respective configurations on the basis of the pulse.

A time-divisional process of the ports using the time slot is also performed by a timing pulse. More specifically, the timing pulse is input to CPUs 16f to 19f of the ports 16 to 19 through the bus 11, and the CPUs 16f to 19f output AV data accumulated in a buffer when the timing pulse (time slot signal) is input to a recording/reproducing section 22, or outputs a command for instructing reproduction of the AV data to the recording/reproducing section 22. In this manner, the respective ports time-divisionally access the recording/reproducing section 14.

The interface 12b converts a control signal input from a control panel 21 into a control signal which can be transferred to the internal bus 11.

The control panel 21 is a user interface, for an operator, constituted by various buttons for instructing control of recording, reproducing, and the like of data, a GUI (Graphic User Interface) for performing editing, and the like. The control panel outputs a control signal for instructing the recording, the editing, or the like from the control panel. The I/F 12b which receives the control signal converts the control signal into a signal of a format which can be transferred to the internal bus 11.

The information management section 13 is constituted by a file management section 13a and a network driver 13b.

The file management section 13a is to manage AV data recorded on the disk array section 22 of the recording/reproducing section 14 in predetermined units, e.g., in units of materials, materials in units of commercials or materials in units of news programs, in units of files.

More specifically, the file management section 13a holds a file system as a database. This file system is constituted by data representing a specific region of a disk in which each file is recorded, more particularly, a specific address on the disk from which the file is recorded (start address), a specific region up to which a file is continuously recorded (obtained by expressing a continuous recording length with an address length), pointer information on the start address of the continuous recording region if a file is intermittently recorded, and a continuous recording length from the start address of the continuous recording region. With this file system, in a host, a file is designated to perform a recording process, a reproducing process, or the like. For example, a file designated by the control panel 21 is input to the file management section 13a through the timing management section 12 and the internal bus 11. By accessing the file system, an access region on the section 22 is recognized, and a control signal which designates the region is transferred to the recording/reproducing section 14 through the internal bus 14, so that each disk 22 can actually reproduce or record data.

In this file system, as with the form described with respect to the recorded region, a start address on a disk of the unrecorded region, a continuous unrecorded region length, if the unrecorded regions are intermittent, pointer information on a start address of the next unrecorded region, a start address of the region, and the like. When a control signal for instructing recording is input from the host by the same manner as described above, the control signal representing an unrecorded region is transferred to the recording/reproducing section 14 through the internal bus 11 to record data.

The recording/reproducing section 14 is constituted by a buffer 14a, a video data array controller 14b, an audio data array controller 14c, a video hard disk 22a, and an audio hard disk 22b.

The buffer 14a temporarily accumulates data transferred through the bus 11 and distributes, for example, by lumping together, AV data input in a time slot period to the video data array controller 14b and the audio data array controller 14c. The buffer 14a receives AF data reproduced from the hard disks 22a and 22b to output predetermined AV data in the time slot period.

As for data output from the buffer 14a, the video data is output to the video data array controller 14b, and the audio data is output to the audio data array controller 14c.

The video data array controller 14b distributes the input video data to the respective hard disk drives 22a. At this time, parity data (even-number parity or odd-number parity) is formed to respective video data. The respective video data are output to one video hard disk drive 22a of the plurality of the hard disk drives 22a. The video data are accumulated in the respective hard disks 22a by so-called RAID-3.

The audio data array controller 14c accumulates the input audio data in both the two hard data drives 22b. The audio data are accumulated in a configuration of RAID-1.

In any case, this embodiment is not limited to these RAID configurations. Even though the controllers 14b and 14c use any RAID configuration of RAID-1, RAID-2, RAID-3, RAID-4, RAID-5, and RAID-6 configurations, and the like, the present invention can be realized.

The array controllers 14b and 14c are not limited to the configurations in which the hard disks 22a and 22b are connected to the outputs of the array controllers 14b and 14c, respectively. A plurality of RAID configurations may be connected to the outputs of the controllers 14b and 14c, respectively. More specifically, the hard disk drives 22a and 22b may have array configurations each constituted by a plurality of hard disk drives.

In this manner, accumulation of AV data in the respective hard disks by way of the controllers 14b and 14c is controlled by commands, for instructing recording, transmitted from the CPUs 16f and 18f of the ports 16 and 18 together with the AV data in the time slot period. More specifically, the commands transferred together with the AV data are output to the controllers 14b and 14c through the buffer 14a. The controllers 14b and 14c analyze the commands to record the analyzed and transferred data.

Therefore, when a command for instructing reproduction of data are input from the ports 16 and 18 to the buffer 14a in the time slot period and transferred to the controllers 14b and 14c, the controllers 14b and 14c control the hard disks 22a and 22b to reproduce the data, thereby reproducing desired data.

The command analysis section 15 receives a command from a linear editing machine 23 connected to the AV data recording/reproducing apparatus 10, interprets the command, and converts the command into command process contents in the AV data recording/reproducing apparatus 10, so that the command analysis section 15 can cause the AV data recording/reproducing apparatus 10 to perform various processes. More specifically, a "Cue Up" command for instructing a search for the start of a material, an "Edit Preset" command for instructing a port or the like for editing, a "Play" command for instructing reproduction, an "Edit On" command for instructing the start of editing, an "Edit Off" for instructing the end of editing, and the like are output from the linear editing machine 23.

Here, the linear editing is referred to an edit which is performed in a time series by mainly using a tape-like recording medium. The nonlinear editing is to perform an edit which is not always performed in a time series by mainly using a disk-like recording medium, a semiconductor memory, or the like. In this embodiment, since the hard disks are used as the recording media of the AV data recording/reproducing apparatus 10, nonlinear editing can be performed. Since a tape cassette is used as the linear editing machine 23, linear editing is performed. The linear editing in which, when a material of an editing destination is inserted into a material of an editing source, the phases of both the materials are adjusted to reproduce or record the materials at the timing of the insertion is different from the nonlinear editing in which editing is performed by determining only an editing point without adjusting the phases of the materials. In this manner, due to the different editing operations or the different editing controls, commands handled in respective editings are different from each other.

The present invention has a characteristic feature in that even though the linear editing machine and the nonlinear editing machine which handle different commands are connected to each other, desired editing can be performed. The present invention also has a characteristic feature in that data accumulated in a nonlinear device can be edited by using a conventional linear editing machine.

The command analysis section 15 serves as an interface of a command between the AV data recording/reproducing apparatus 10 which performs such nonlinear editing and the linear editing machine 23. Editing or the like of the linear editing machine 23 performed by the command analysis section 15 will be described later.

The AV data recording/reproducing apparatus 10 comprises a plurality of ports 16, 17, 18, and 19.

The input port (R1) 16 is constituted by a switching means 16c, an encoder 16d, a buffer 16e, and the CPU 16f.

The switching means 16c receives data including AV data input from a terminal 16g. As a data format, there is provided the SDI format or the SDTI format described above. AV data is also input from an editing section 20a to the switching means 16c. Any one of the two inputs is output while switching the two inputs. The data input from the terminal 16g is also output to the editing section 20a. The details of the editing section 20a will be described later.

The encoder 16d receives the data output from the switching means 16c, extracts AV data from data of, e.g., the SDI or SDTI format, and performs a compression process such as an MPEG compression process using inter-frame correlation or a DV compression process of an in-frame compression system to data, e.g., video data which can be recorded on the hard disk 22. The encoder 16d can also perform a compression process such as MPEG audio to audio data. In addition, in order to prevent image quality from being deteriorated by the compression process, the data can also be output from the encoder 16d without being compressed.

The buffer 16e temporarily accumulates the AV data output from the encoder 16d. This is because time-divisional control is performed to the bus 11 by the time slot. The accumulation is performed to prevent such an inconvenience that recording or reproducing for the hard disk cannot be performed because the plurality of ports 16, 17, and 18 simultaneously access the bus. The AV data accumulated in the buffer 16e is read out when there comes a time slot period allocated by control of the CPU 16f, and output to the recording/reproducing section 14 through the bus 10.

The input port 18 (R2) has the same configuration as that of the input port 16 (R1) and performs the same operation as that of the port 16 (R1).

The output port 17 (P1) is constituted by a buffer 17c, a decoder 17d, a switching means 17e, a CPU 17f, and an output terminal 17g.

The buffer 17c temporarily accumulates AV data output through the bus 10 within a time slot period allocated by the recording/reproducing section 14. This is because a decode process or the like is performed by a predetermined amount.

The decoder 17d processes the AV data output from the buffer 17c and outputs the AV data to the switching means 17e. As the process, a decompression process is performed if the AV data is compressed. The decoder 17d converts the AV data into data of a format for outputting data to the outside, e.g., the SDI data or the SDTI data to output the converted data.

The switching means 17e receives data output from the decoder 17d and data output from the editing section 20a and select any one of the data to output the selected data to the output terminal 17g. The data output from the decoder 17d is also output to the editing section 20a.

The input ports 16 and 18 and the output ports 17 and 19 may have conversion means which perform the process of extracting AV data from the external transmission format such as the SDI format or the SDTI format or which convert the AV data into the external transmission format at the previous stages of the switching means 16c and 18c or the subsequent stages of the switching means 17d and 19d. In this case, the switching means 16c, 17c, 18c, and 19c receive AV data, the encoders 16d and 18d encode the input AV data into data (e.g., compressed data) of a format recorded on a reproducing section 14d, and the decoders 17d and 19d decode the AV data into predetermined amounts of AV data the format of which can be converted into an external transmission format (e.g., a decompression process).

The output terminal 17g outputs data to another broadcast device, a VTR, a switcher, another AV server, a special effects device, and the like through a transmission medium such as a coaxial cable, an Ethernet, or an optical fiber.

The output port 19 (P2) has the same configuration as that of the output port 17 and performs the same operation as that of the output port 17. The editing section 20a is to switch, e.g., two different materials at certain timing and to output the materials as one material. For example, when two materials are accumulated in the disk array section 22, and when one material is switched to the other material at a certain timing, one material is input from the output port 17 to the editing section to output the material to the input port 16. The material is switched to the other material input from the output port 19 at certain timing to output the other material to the input port 16. The data input to the input ports 16 and 18 and data output from the output ports 17 and 19 are input to the editing section 20a, and selectively are switched to input data of any one of the four ports and then, the input ports 16, 18 are made to output and record again the switched data, or the switched data is output to the output ports 17 and 19, so that the data is output to the outside. The editing section 20a is to perform switch editing such as a cut-in operation or a cut-out operation.

A special effects 24 is to perform special effects such as wipe or dissolve at a switching point in the editing section 20a. Two materials to be switched are input from the editing section 20a and subjected to special effects such as wipe, dissolve, page pattern, or mix in several frames before and after the switching timing, and the materials subjected to the special effects are output. The materials are input to the editing section 20a again and output to the predetermined ports 16, 17, 18, and 19. When the materials should be recorded, the materials are output to the input ports 16 and 18 and recorded on the disk array section 22 of the recording/reproducing section 14 by the same operation as described above. When the materials should be output to the outside, the materials are output to the switching means 17e and 19e of the output ports 17 and 19 and output to the outside through the output terminals 17g and 19g by the switching operations of the switching means 17e and 19e. When conversion means for converting a format into an external transmission format such as the SDI format or the SDTI format are connected to the output of the switching means 17e and 19e, the data is converted into data of the SDI format or the SDTI format and output to the outside.

As described above, this AV data recording/reproducing apparatus 10 can perform not only recording and reproducing of AV data but also simple switch editing and special effects.

The recording/reproducing processes of the input ports 16 and 18 and the output ports 17 and 19 are performed depending on control from the control panel 21.

More specifically, the control panel 21 comprises the various buttons as described above. For example, a recording button for instructing recording and a reproducing button for instructing reproduction are operated by an operator to designate recording and reproduction. These instructions are output from the control panel 21 as control signals. The control signals are transferred to the interface IF 12b of the timing management section 12 to be converted into control signals inside the AV data recording/reproducing apparatus 10. The control signals are output to the CPUs 16f, 17f, 18f, and 19f of the respective ports 16, 17, 18, and 19. The outputs to the ports 16, 17, 18, and 19 are transferred from the IF 12b of the timing management section 12 through, e.g., a control bus (not shown). The outputs may be transferred through the bus 10. However, in this case, since time divisional control is performed by a time slot, the outputs are transferred to CPUs 16b, 17b, 18b, and 19b of the respective ports 16, 17, 18, and 19 by using the bus 10 in only an allocated period.

The CPUs 16f, 17f, 18f, and 19f analyze a control signal transferred from the timing management section 12 to decide whether the control signal is a command for instructing recording or a command for instructing reproduction, read AV data accumulated in the buffers 16e and 18e in response to a time slot signal transferred from the timing pulse generator 12a through the bus 11, and output the read AV data to the recording/reproducing section 14 through the bus 11 together with the command for instructing recording. In response to a time slot signal transferred from a timing pulse generator 12e through the bus, a command for instructing reproduction of AV data is output to the recording/reproducing section 14, and AV data reproduced from the recording/reproducing section 14 through the bus 11 is input to the ports 17 and 19. The subsequent processes are performed as described above.

Since the time slot process performed when AV data is reproduced is performed within a time slot period according to a command for instructing reproduction output from the output ports 17 and 19, the reproducing process of the recording/reproducing section 14 is also time-divisionally performed like the recording process. The time slot process is always performed according to commands from the ports 16, 17, 18, and 19 serving as the hosts of the recording/reproducing section 14.

An editing instruction can also be performed by the control panel 21.

A control signal representing an instruction of an editor is output by operating a predetermined button on the control panel 21 representing an editing instruction. The control signal is input to a CPU 20c of the editing processing section 20 through the control bus or the bus 11.

When editing point information, e.g., a time code is designated in a command representing the editing instruction, the CPU 20c controls the editing section 20a such that input materials are switched at the timing. When the command includes an instruction for manually switching materials, similarly, the editing section 20a is controlled by inputting a control signal representing a switching timing from the control panel 21 to switch the materials.

In addition, a GUI (Graphic User Interface) screen (not shown) is arranged on the control panel 21, special effects patterns of different types, e.g., displays representing dissolve, page turn, and wipe are made. One of the displays is selected by an operation on the control panel 21. In this manner, special effects performed before or after the editing point by the special effects section 24 are determined, and a control signal representing this pattern is output from the control panel 21 and input to a CPU 21c of the controller 20 through the IF 12b of the timing management section 12 and the bus 11 or the control bus. The special effects is controlled by the special effects 24 to perform predetermined special effects to a material selected by the editing section 20a.

When normal linear editing is performed, two reproducing VTRs for reproducing materials, one recording VTR for recording data reproduced from the reproducing VTRs, and an editing machine for causing the reproducing VRTs and the VTR to reproduce and record materials at editing timing are required. The two reproducing VTRs are required because different two materials are reproduced. Linear editing may be performed by one of the reproducing VTRs. Data reproduced by the reproducing VTR is recorded by the recording VTR, and a tape cassette on which different materials are recorded is loaded on the reproducing VTR. The materials are reproduced by the reproducing VTR such that the different materials are recorded from the end of recording of the recording VTR, and the materials are recorded by the recording TVR from the end of recording. In this case, control of recording or reproduction is performed by the editing machine.

As described above, at least two VTRs (for reproduction or for recording) are required to perform linear editing.

In the present invention, an editing machine 23 is connected to the AV data recording/reproducing apparatus 10, and the output ports 17 and 19 are operated as a reproducing VTR, and the input ports 16 and 18 are operated as a recording VTR, so that editing is performed by only the data recording/reproducing apparatus 10. At the same time, linear editing can be performed by using the conventional linear editing machine 23.

Figure 2B:
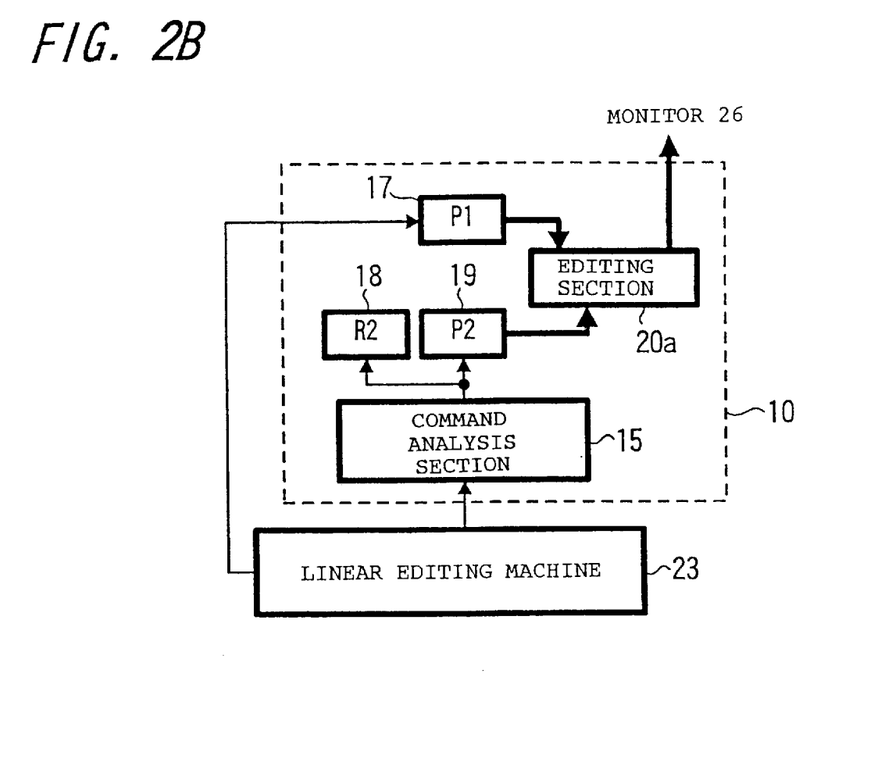
FIG. 2B is a diagram showing a conceptual configuration when linear editing is performed by connecting a linear editing machine and the AV data recording,/reproducing apparatus in FIG. 2A to each other.
Figure 2C:
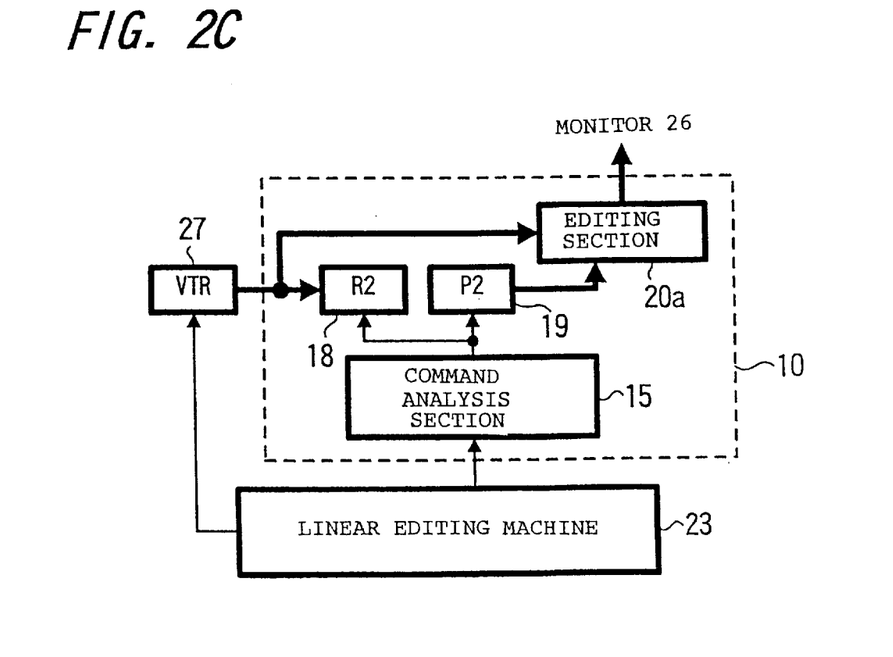
FIG. 2C is a diagram showing a conceptual configuration when linear editing is performed by connecting a linear editing machine and the AV data recording/reproducing apparatus in FIG. 2A to each other.

FIGS. 2B and 2C are block diagrams showing conceptual configurations obtained when the linear editing machine 23 and the AV data recording/reproducing apparatus 10 are connected to each other to perform the linear editing.

FIG. 2B shows an example obtained when linear editing is performed by using the output port (P1) 17 and the output port (P2) 19 are reproducing VTRs in linear editing and using the input port (R2) 18 as a recording VTR.

FIG. 2C shows an example obtained when linear editing is performed by using an external VTR 27 and the output port (P2) 19 as reproducing VTRs and using the input port (R2) 18 as a recording VTR.

Selection performed when the linear editing is performed by the input port and the output port is performed on the control panel 21 or selectively set in advance. Thin lines in FIGS. 2B and 2C indicate lines on which control signals are transferred, and thick lines indicate lines on which AV data are transferred.

In FIG. 2B, a command for instructing recording or reproduction is output from the linear editing machine 23, and the command is output to the command analysis section 15 and the port 17 of the AV data recording/reproducing apparatus 10. The output ports 17 and 19 comprise terminals to which the command from the external linear editing machine 23 is input (not shown in FIG. 1). The input command is input to the CPUs 17f and 19f of the output ports 17 and 19. The command is analyzed by the CPUs 17f and 19f to cause the output ports 17 and 19 to perform control for instructing reproduction.

The contents of a command output from the linear editing machine 23 to the command analysis section 15 are analyzed by the command analysis section 15 as described above. The command is converted into a command used inside the AV data recording/reproducing apparatus 10. The converted command is output to the output port 19 and the input port 18 through the bus 11 or the control bus depending on the analyzed contents. For example, when a control signal for instructing reproduction is input at certain timing, the converted command is output to the output port 19. When a control signal for instructing recording is input, the converted command is output to the input port 19. Thin lines in FIGS. 2A and 2B indicate lines on which control signals are transferred, and thick lines indicate lines on which AV data are transferred.

Materials to be edited are output from the output ports 17 and 19 are output by the control signal from the linear editing machine 23 and output to the editing section 20a. The two input materials are switched by the editing section 20a, so that a certain material is switched to the other material. In this switching, materials output from the editing section 20a are displayed on a monitor 26, and the materials are switched by an operator operating the control panel 21. As another configuration, although not shown, a controller for linear editing is connected to the editing section 20a of the data recording/reproducing apparatus 10, the editing section 20a is switched at a desired timing by operating the controller.

The edited materials are input from the editing section 20a to the input port 18 as described above, and one of the materials from the editing section 20a is selected by a switching means 18c to be output to the recording/reproducing section 14.

As shown in FIG. 2B, when editing is performed with only materials recorded on the disk array section 22, a material to be edited may be recorded on the recording/reproducing section 14. In general, materials are not reproduced and recorded as described above.

As described above, since the material recorded on the disk array section 22 are managed by a file system such that each material is considered as one file, by only changing the contents of the filing system, for example, by storing information indicating an editing result of a file to be edited in a file management section 13a as a virtual file (VFL: Vertial File), editing is completed. The editing process using the VFL will be described later.

FIG. 2C illustrates a case in which editing is performed such that the output port 17 used as a reproducing VTR in linear editing is used as an external VTR 27.

The linear editing machine 23 is connected to the VTR 27 and the command analysis section 15 of the data recording/reproducing apparatus 10. A configuration for connection to the VTR 27 is the same as that in conventional linear editing.

A control signal from the linear editing machine 23 for instructing reproduction or recording, is output to the VTR 27 and the command analysis section 15.

The VTR 27 reproduces a material to be edited according to the control signal from the linear editing machine 23. Although the reproduced material is input to the input port 18, data input in the previous stage of the switching means 18c is input to the editing section 20a (for descriptive convenience, FIG. 2C shows a configuration in which the material is also output to the editing section 20a in the previous stage of the input port 18).

The control signal output from the linear editing machine 23 is designed to output to the input port 18 and the output port 19 through the command analysis section 15 according to the contents of the control signal as in FIG. 2A. The following operation is the same as the operation in FIG. 2B.

In general, when editing recording is performed by a magnetic tape device such as a VTR, a recording pattern of an input signal and a CTL signal (reference signal of servo control) on a magnetic tape is controlled such that the recording pattern is continuous at an editing point without being interrupted. More specifically, the magnetic tape device receives an editing recording instruction, the magnetic tape device is started in a reproduction state (pre-roll reproduction) several seconds before a recording start point. Drum servo adjusts a drum rotation speed and a phase to an input signal (phase adjustment). Capstan servo controls a running speed and a phase of a tape such that a video head accurately scans a video track with reference to a CTL signal. In this manner, a reproduction video signal and an input video signal are completely synchronized, and the continuity at the editing start point can be achieved. In a linear editing procedure, various commands required to control the magnetic tape device are time-serially generated. For example, the linear editing machine 23 generates desired commands for respective instructions: (1) cue up instruction representing a search for the start of a material to be edited recorded on the magnetic tape; (2) running start instruction of the magnetic tape; (3) pre-roll running instruction of a predetermined period of time; (4) instruction of a desired editing start point (IN point) and a desired editing end point (OUT point); (5) post-roll of a predetermined period of time (representing a reproduction state in a period of several seconds from the editing end point); and (6) running stop instruction of the magnetic tape.

Figure 3:
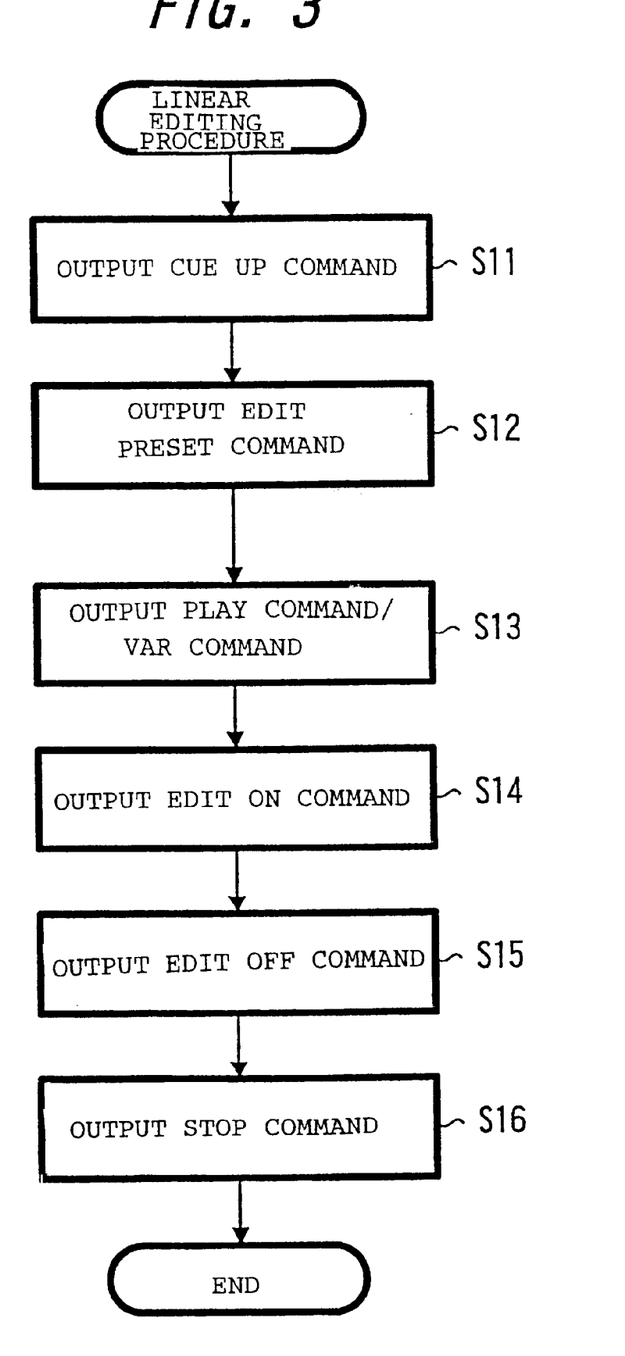
FIG. 3 is a command sequence output from a linear editing machine.

FIG. 3 is a command sequence output from the linear editing machine 23. In FIG. 3, in step S11 corresponding to (1) of the operation procedure, a CUE UP command is output. In step S12 (which is not described in the above operation procedure), an EDIT PRESET command for assigning an editing channel (independent assignment for a video channel or an audio channel). In step S13 corresponding to (2) and (3) in the operation procedure, a PLAY command (command for instructing reproduction)/VAR command (command for instructing phase adjustment) is output. In step S14 corresponding to (4) in the operation procedure, an EDIT ON command representing the start of editing and an EDIT OFF command representing the end of editing are output (step S15). In step S16 corresponding to (6) in the operation procedure, an STO command is output.

Figure 4:
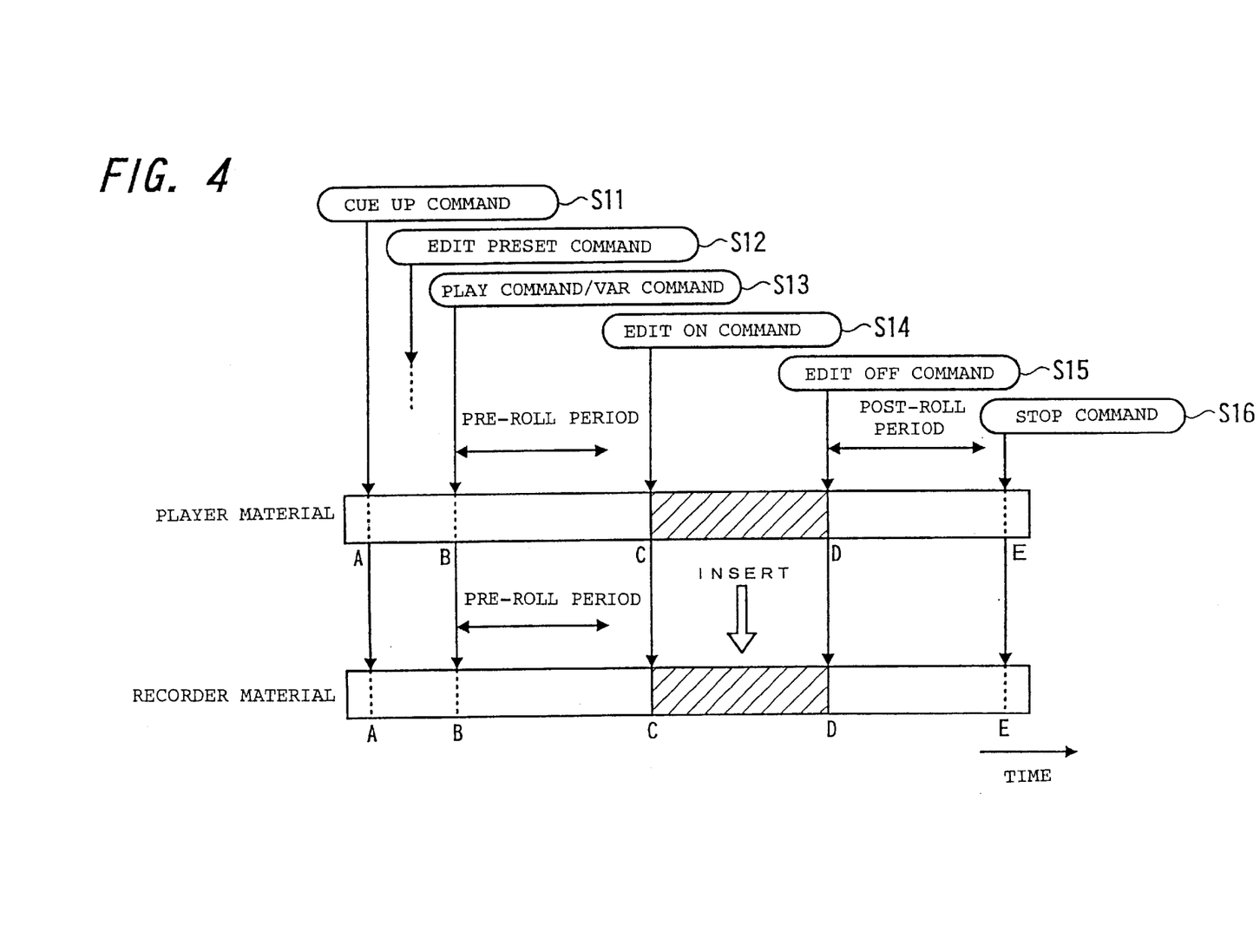
FIG. 4 is a conceptual diagram of linear editing.

FIG. 4 is a diagram illustrating the relationship between the above commands and materials when linear editing is performed by using the linear editing machine 23.

In this case, so-called insert editing for inserting a reproduced material (PLAYER material) into a recorded material (RECORDER material) is performed.

In case of linear editing using a reproducing VTR and a recording VTR, a RECORDER material is recorded on a tape cassette of the recording VTR in advance, and a PLAYER material is recorded on a tape cassette of the reproducing VTR in advance. The PLAYER material reproduced from the reproducing VTR is inserted into a predetermined region of the RECORDER material by the recording VTR.

Cue Up commands are output from the linear editing machine 23 to both the recording VTR and the reproducing VTR to search for an editing starting point. Thereafter, an editing channel is assigned by the Edit Preset command, and the recording VTR and the reproducing VTR are instructed by the PLAY/VAR command to perform reproduction and phase adjustment. With this command, the recording VTR and the reproducing VTR begin to reproduce a desired PLAYER material and a desired RECORDER material. At a position designated by the EDIT ON command, the material reproduced from the reproducing VTR is inserted into and recorded on the RECORDER material of the recording VTR. Thereafter, when the EDIT OFF command is instructed, the editing operation is ended at the designated point, and the insert recording is completed. Thereafter, in a post-roll period, the PLAYER material and the RECORDER material are reproduced, and tape running is stopped by inputting a STOP command, so that a series of operations are completed.

The data recording/reproducing apparatus 10 according to this embodiment does not use all the commands output from the editing machine, but extracts only commands required for editing and the commands are output from the command analysis section 15 to the input port 18, the output port 17 or 19, or the external VTR 27.

Figure 5:
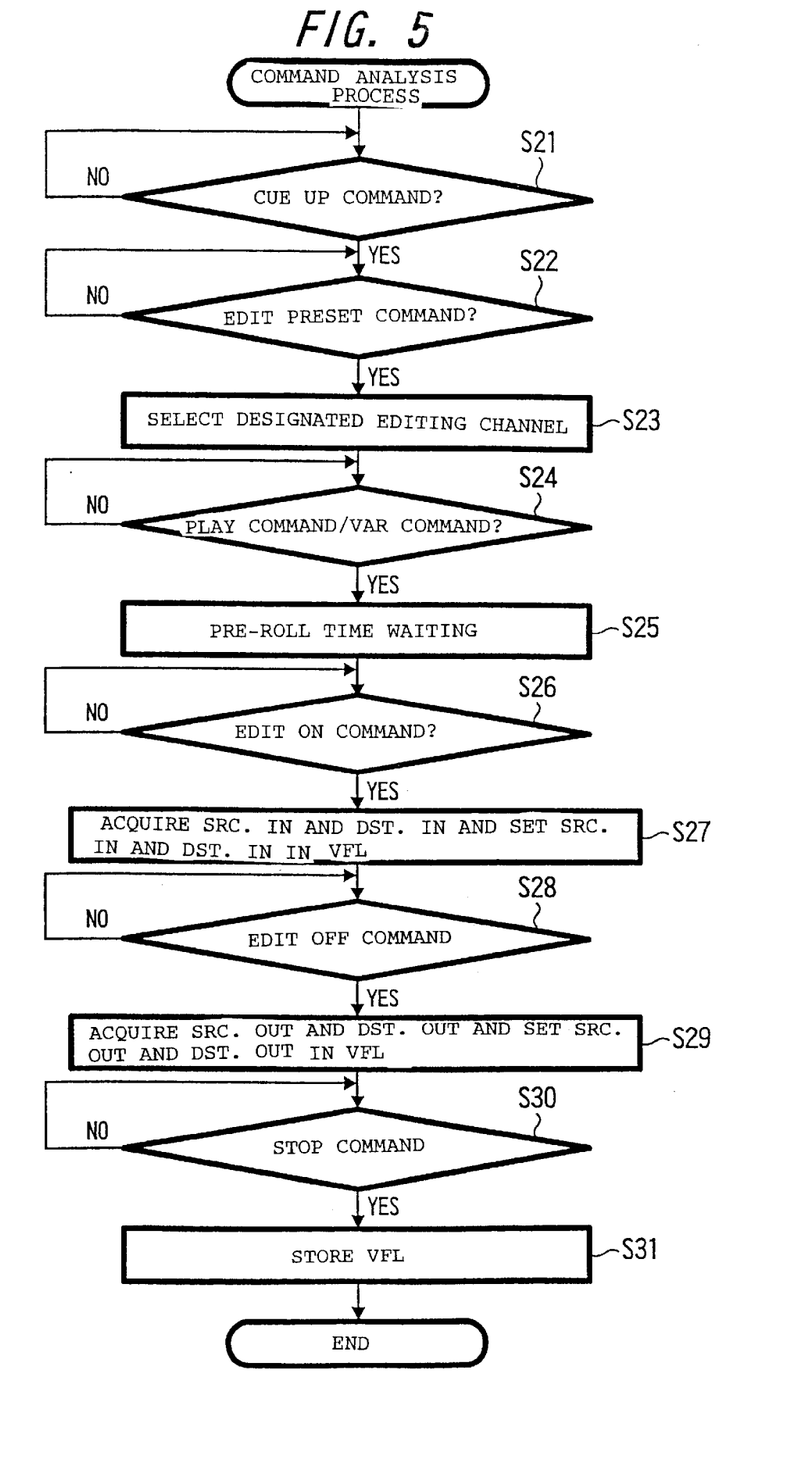
FIG. 5 is a rough operational flow chart of a command analysis section.

FIG. 5 is a rough operational flow chart of the command analysis section 15. In this flow chart, a CUE UP command from the linear editing machine 23 is waited in step S21. When the CUE UP command is input, an EDIT PRESET command is waited in step S22. When the EDIT PRESET command is input, the editing channel designated by the command is selected in step S23, and a PLAY command/VAR command is waited in step S24. When the PLAY command/VAR command is input, waiting is made for a pre-roll period in step S25, and an EDIT ON command is waited in step S26. When the EDIT ON command is input, an editing start point (to be referred to as "SRC. IN" hereinafter) of a file to be edited and an editing start point (to be referred to as "DST. IN" hereinafter) of an editing result file are acquired in step S27, and these acquired data are recorded in a virtual file (VFL) as editing result information. An EDIT OFF command is waited in step S28. When the EDIT OFF command is input, an editing end point (to be referred to as "SRC. OUT" hereinafter) of a file to be edited and an editing end point (to be referred to as "DST. out" hereinafter) of an editing result file are acquired in step S29, and these acquired data are recorded in the VFL as editing result information. Thereafter, a STOP command is waited in step S30. When the STOP command is input, the VFL is stored in step S31, and the flow chart is ended.

The VFL will be described below.

The following case is considered. That is, the data recording/reproducing apparatus 10 and the editing machine are connected to each other, a certain file (constituted by video data and audio data) recorded on the data recording/reproducing apparatus 10 is reproduced, and the file is edited by the editing machine. All the data of the file reproduced from the data recording/reproducing apparatus 10 are output to the editing machine as a file to be edited. In the editing machine, the file output from the data recording/reproducing apparatus 10 is input to perform editing. In this case, the edited file is not output to the data recording/reproducing apparatus 10. only information representing an editing result is output to the data recording/reproducing apparatus 10, and the information representing the editing result is called a VFL. A file to be edited is accumulated in the data recording/reproducing apparatus 10 in advance, and recording of a file which is edited again is a problem in consideration of an accumulable capacity of the data recording/reproducing apparatus 10. Therefore, when the VFL is output from the editing machine to the data recording/reproducing apparatus 10, the edited file can be reproduced on the basis of the VFL, and the file which is edited again can be prevented from being recorded again.

The VFL is constituted by a time code (or an address value from the start of the file) representing a file name and an editing start point and a time code (or an address value from the start of the file) representing an editing end point.

The VFL is accumulated in the file management section 13a through the network driver 13b of the data recording/reproducing apparatus 10. The VFL may be input to the input ports 16 and 18 and accumulated in the file management section 13a through the bus 11.

Only an edited file can be reproduced on the basis of the VFL information accumulated in the file management section 13a.

Figure 6:
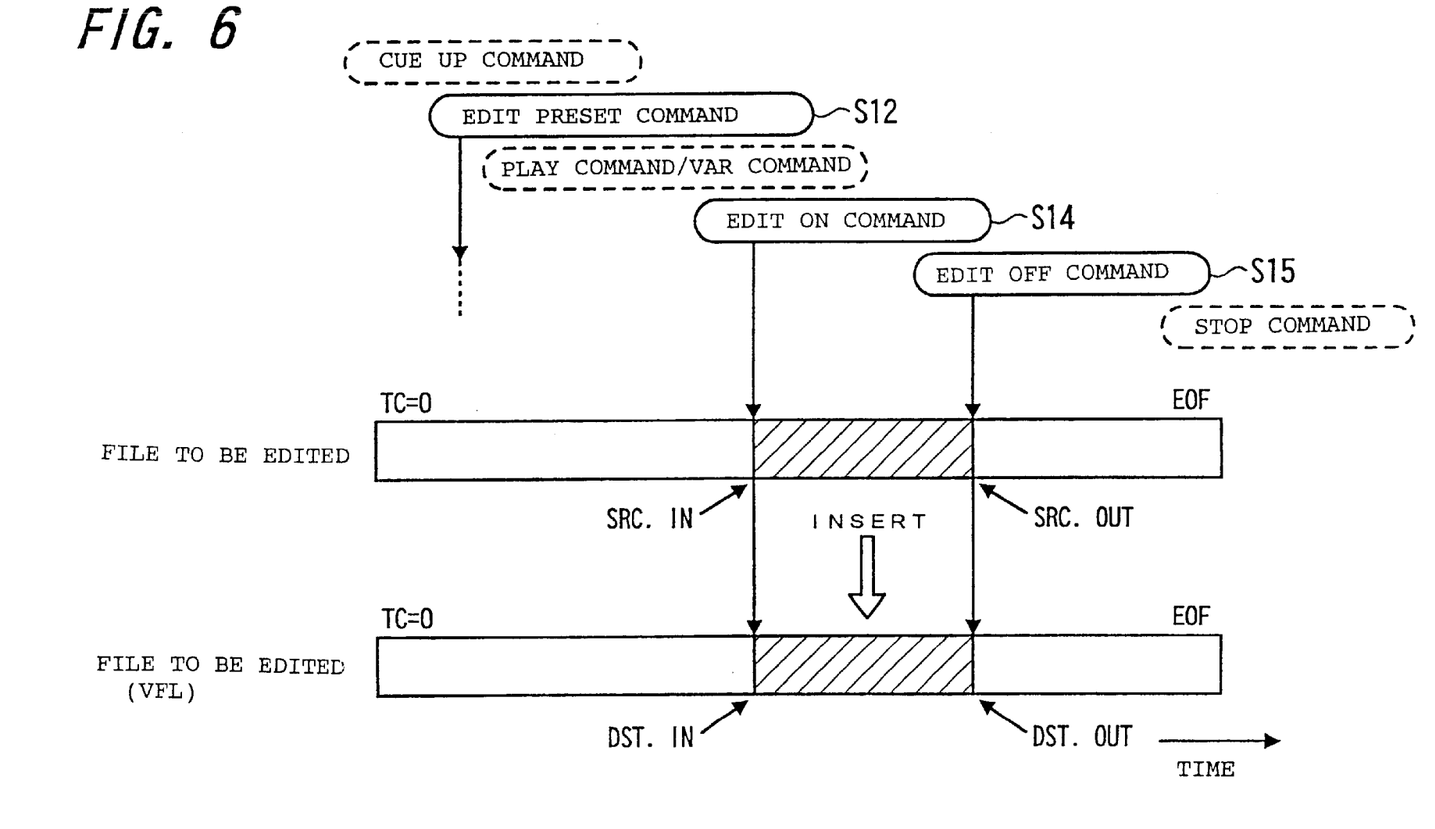
FIG. 6 is a conceptual diagram of nonlinear editing.

FIG. 6 typically shows editing operations in the editing system shown in FIGS. 2B and 2C. FIG. 6 shows the following manner. That is, various commands (in particular, the "EDIT PRESET" command, the "EDIT ON" command, and the "EDIT OFF" command) required for nonlinear editing are extracted, nonlinear editing operations corresponding to the respective commands are time-serially executed. An editing channel can be selected in response to the EDIT PRESET command from the linear editing machine 23, and the SRS. in (editing start point of a file to be edited) and the DST. IN (editing start point of an editing result file) can be acquired in response to the EDIT ON command. In addition, the SRC. OUT (editing end point of a file to be edited) and the DST. OUT (editing end point of editing result file) can be acquired. For this reason, the following outstanding advantage can be obtained. That is, the editing operation of the AV data recording/reproducing apparatus 10 can be performed without causing an operator to be conscious of nonlinear editing by using the linear editing machine 23 which has been conventionally used in broadcast stations and in the world of post-production.

More specifically, when a file to be edited is inserted into an insert portion of the editing result file (VFL), an editing process can be performed in the data recording/reproducing apparatus 10.

The main functions of this embodiment is functionally realized by organic connections between hardware resources including a microcomputer and software resources such as an OS and various programs. However, since general purpose hardware resources and a general purpose OS are used as the hardware resources and the OS, it can be said that what matters that is indispensable to the present invention is substantially converged on the operation program (see FIG. 5) of the command analysis section 15. Therefore, the present invention includes a recording medium such as a floppy disk, an optical disk, a compact disk, a magnetic tape, a hard disk or a semiconductor memory in which all or a main part of the operation program of the command analysis section 15 is stored or a construct (unit goods, finished goods, or semi-finished goods) including these recording media. The recording medium or the construct itself is on the recording medium or the construct includes a recording medium or a construct which is on a network and provides only recording contents.

According operation using a considerably familiar linear editing machine can be performed. Therefore since an operation of nonlinear editing need not be newly studied, a conventional linear editing machine in a broadcast station, a post- production, or the like can be utilized. An AV data recording/reproducing apparatus which can be used immediately after the AV data recording/reproducing apparatus is installed can be provided

What is claimed is:

1. An AV data recording and reproducing apparatus comprising:

a command analysis section that receives a linear editing command, translates the received linear editing command into a non-linear editing command and generates editing result information on the basis of the non-linear editing command, the editing result information including instructions for editing the AV data on a randomly-accessible data storage system to generate edited AV data;

a recording section for recording AV data;

an editing section which edits the AV data recorded on the recording section in response to the editing result information; and a reproducing section which reads the AV data from the recording section, and on the basis of the editing result information, reproduces the AV data as the edited AV data.

2. An AV data recording and reproducing method comprising:

recording AV data by a recording section;

receiving a linear editing command;

translating the received linear editing command into a non-linear editing command;

generating the editing result information on the basis of the non-linear editing command, the editing result information including instructions for editing the AV data on a randomly-accessible data storage system to produce edited AV data; and reading the AV data from the recording section on the basis of the editing result information to reproduce the edited AV data.

3. A recording medium which stores a program for operating of an AV data recording and reproducing apparatus, the program comprising:

a recording section for recording AV data;

a command analysis section which receives a linear editing command, translates the received linear editing command into a non-linear editing command and generates editing result information on the basis of the non-linear editing command, the editing result information including instructions for editing the AV data on a randomly-accessible data storage system to produce edited AV data;

an editing section which edits the AV data recorded on the recording section based on the editing result information; and a reading section which reads the AV data from the recording section on the basis of the editing result information to reproduce the edited AV data.

4. An AV data recording and reproducing apparatus comprising:

disk array section for recording AV data;

a command analysis section which receives a linear editing command, translates the received linear editing command into a non-linear editing command and generates editing result information on the basis of the non-linear editing command, the editing result information including instructions for editing the AV data on a randomly-accessible data storage system to produce edited AV data;

an editing section which edits the AV data recorded on the disk array section based on the editing result information; and a reading section which reads the AV data from the disk array section on the basis of the editing result information to reproduce the edited AV data.

5. An AV data recording and reproducing method which records AV data on a disk array comprising:

receiving a linear editing command;

translating the received linear editing command into a non-linear editing command;

generating editing result information on the basis of the non-linear editing command, the editing result information including instructions for editing the AV data on a randomly-accessible data storage system to produce edited AV data;

editing the AV data recorded on the disk array section based on the editing result information; and reading the AV data from the disk array section on the basis of the editing result information to reproduce the edited AV data.

6. A recording medium which stores a program for operating an AV data recording and reproducing apparatus which has a disk array for recording AV data comprising:

a command analysis section which receives a linear editing command, translates the received linear editing command into a non-linear editing command and generates editing result information on the basis of the non-linear editing command, the editing result information including instructions for editing the AV data on a randomly-accessible data storage system to produce edited AV data;

an editing section which edits the AV data recorded on the disk array based on the editing result information; and a reading section which reads the AV data from the disk array section on the basis of the editing result information to reproduce the edited AV data.

* * * * *